US006347136B1

United States Patent
Horan

(10) Patent No.: US 6,347,136 B1
(45) Date of Patent: *Feb. 12, 2002

(54) CALLING PARTY ANNOUNCEMENT MESSAGE MANAGEMENT SYSTEMS AND METHODS

(75) Inventor: Douglas F. Horan, Los Gatos, CA (US)

(73) Assignee: Winbond Electronics Corporation (TW)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/354,536

(22) Filed: Jul. 15, 1999

(51) Int. Cl.⁷ .............................. H04M 1/56; H04M 1/64
(52) U.S. Cl. .............................. 379/142.01; 379/88.2; 379/88.21; 379/67.1; 379/88.23
(58) Field of Search ................................ 379/142, 215, 379/67.1, 68, 71, 76, 88.04, 88.07, 88.16, 88.2, 88.21, 88.22, 88.23, 88.27, 88.28, 142.01, 142.17

(56) References Cited

U.S. PATENT DOCUMENTS

| | | | | |
|---|---|---|---|---|
| 4,989,179 A | * | 1/1991 | Simko | 365/45 |
| 5,126,967 A | * | 6/1992 | Simko | 365/45 |
| 5,388,064 A | * | 2/1995 | Khan | 365/45 |
| 5,400,393 A | * | 3/1995 | Knuth et al. | 379/88 |
| 5,526,406 A | | 6/1996 | Luneau | |
| 5,623,436 A | * | 4/1997 | Sowards et al. | 365/45 |
| 5,629,890 A | * | 5/1997 | Engh | 365/185.03 |
| 5,664,060 A | * | 9/1997 | Jarrett et al. | 704/270 |
| 5,754,470 A | * | 5/1998 | Engh et al. | 365/185.03 |
| 5,883,942 A | * | 3/1999 | Lim et al. | 379/142 |
| 5,959,876 A | * | 9/1999 | Gordon et al. | 364/45 |
| 6,005,927 A | * | 12/1999 | Rahrer et al. | 379/142 |

\* cited by examiner

*Primary Examiner*—Wing F. Chan
*Assistant Examiner*—Rexford N Barnie
(74) *Attorney, Agent, or Firm*—Blakely, Sokoloff, Taylor & Zafman LLP

(57) ABSTRACT

A calling party announcement apparatus and method for providing the identity of the caller in a non-synthesized, pre-recorded human speech. The invention detects and decodes the Incoming Caller Line Identification (ICLID) signal between ring signals before the called party answers the phone and announces the calling party's name and/or phone number. The called party answers the telephone or rejects the call before the receiver goes off-hook. Additionally, if the called party elects to accept the call, the call is answered, an individualized pre-recorded message is played back, or any other preferences selected with respect to the ICLID information is performed. An important aspect of the invention is the ability to play and record announcements and messages without the use of expensive and power-consuming digital signal processors. The invention provides for recording and locating pre-recorded announcements and predetermined preferences for call acceptance using the decoded ICLID information.

21 Claims, 7 Drawing Sheets

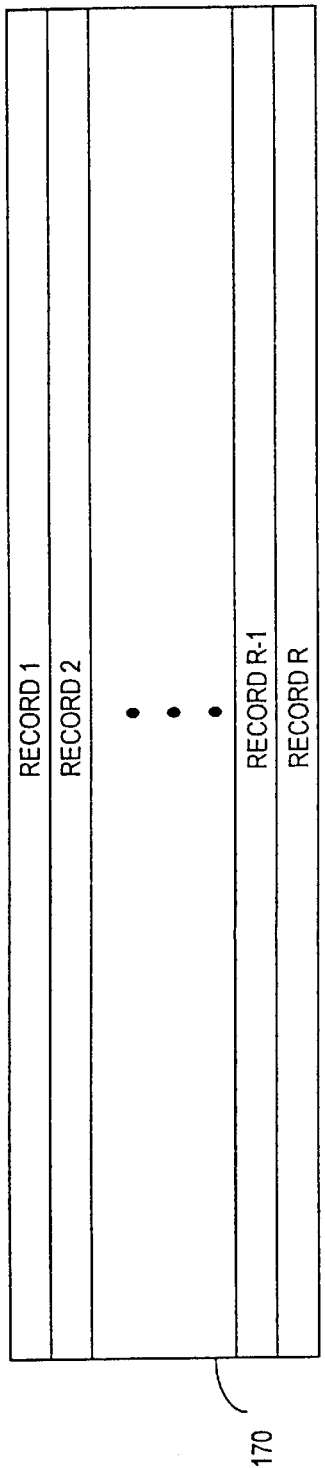
FIGURE 2
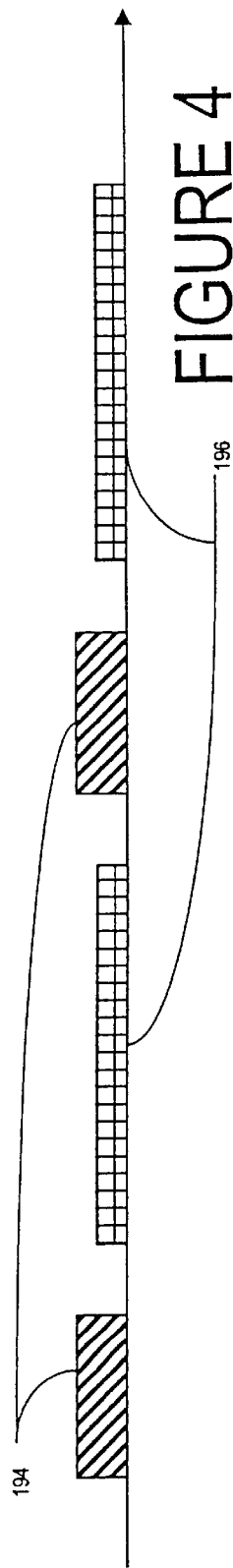
FIGURE 3
FIGURE 4

Configuration Register 0

| Control Bit | Name | Block Affected | Description |
|---|---|---|---|
| CFG0 <15> | AIG1 | ANAIN AMP | Gain set |
| CFG0 <14> | AIG0 | ANAIN AMP | Gain set |
| CFG0 <13> | AIPD | ANAIN AMP | Power down |
| CFG0 <12> | AXG1 | AUXIN AMP | Gain set |
| CFG0 <11> | AXG0 | AUXIN AMP | Gain set |
| CFG0 <10> | AXPD | AUXIN AMP | Power down |
| CFG0 <9> | INS0 | INPUT MUX | Input source select |
| CFG0 <8> | AOS2 | ANAOUT MUX | Mux select |
| CFG0 <7> | AOS1 | ANAOUT MUX | Mux select |
| CFG0 <6> | AOS0 | ANAOUT MUX | Mux select |
| CFG0 <5> | AOPD | ANAOUT AMP | Power down |
| CFG0 <4> | OPS1 | OUTPUT MUX | Mux select |
| CFG0 <3> | OPS0 | OUTPUT MUX | Mux select |
| CFG0 <2> | OPA1 | OUTPUT AMPS | Amplifier/gain select |
| CFG0 <1> | OPA0 | OUTPUT AMPS | Amplifier/gain select |
| CFG0 <0> | VLPD | VOLUME CONTROL | Power down |

Configuration Register 1

| Control Bit | Name | Block Affected | Description |
|---|---|---|---|
| CFG1 <15> | VLS1 | VOL MUX | Mux select |
| CFG1 <14> | VLS0 | VOL MUX | Mux select |
| CFG1 <13> | VOL2 | VOLUME CONTROL | Volume level |
| CFG1 <12> | VOL1 | VOLUME CONTROL | Volume level |
| CFG1 <11> | VOL0 | VOLUME CONTROL | Volume level |
| CFG1 <10> | S1S1 | SUM1 MUX | Mux select |
| CFG1 <9> | S1S0 | SUM1 MUX | Mux select |
| CFG1 <8> | S1M1 | SUM1 AMP | Sum1 select |
| CFG1 <7> | S1M0 | SUM1 AMP | Sum1 select |
| CFG1 <6> | S2M1 | SUM2 AMP | Sum2 select |
| CFG1 <5> | S2M0 | SUM2 AMP | Sum2 select |
| CFG1 <4> | FLS0 | FILTER MUX | Mux select |
| CFG1 <3> | FLD1 | FILTER CLOCK | Sample rate select |
| CFG1 <2> | FLD0 | FILTER CLOCK | Sample rate select |
| CFG1 <1> | FLPD | FILTER | Power down |
| CFG1 <0> | AGPD | AGC AMP | Power down |

FIGURE 8

CMD1

| Command bit | C7 | C6 | C5 | C4 | C3 | C2 | C1 | C0 |
|---|---|---|---|---|---|---|---|---|
| Function | RUN | P/R* | PU | IAB | MC | CS1 | CS0 | CO |
| Bit | 0 | X | a | 1 | 0 | 0 | 1 | X |

DATA1

| CFG0 | AIG1 | AIG0 | AIPD | AXG1 | AXG0 | AXPD | INS0 | AOS2 | AOS1 | AOS0 | AOPD | OPS1 | OPS0 | OPA1 | OPA0 | VLPD |
|---|---|---|---|---|---|---|---|---|---|---|---|---|---|---|---|---|
| Bit | b | c | 0 | X | X | 1 | X | 0 | 0 | 0 | 0 | 0 | 1 | 0 | 1 | 1 |

CMD2

| Command bit | C7 | C6 | C5 | C4 | C3 | C2 | C1 | C0 |
|---|---|---|---|---|---|---|---|---|
| Function | RUN | P/R* | PU | IAB | MC | CS1 | CS0 | CO |
| Bit | 0 | X | 1 | 1 | 0 | 1 | 0 | X |

DATA2

| CFG1 | VLS1 | VLS0 | VOL2 | VOL1 | VOL0 | S1S1 | S1S0 | S1M1 | S1M0 | S2M1 | S2M0 | FLS0 | FLD1 | FLD0 | FLPD | AGPD |
|---|---|---|---|---|---|---|---|---|---|---|---|---|---|---|---|---|
| Bit | X | X | X | X | X | X | X | 1 | 1 | 1 | 1 | X | X | X | 1 | 1 |

FIGURE 9

CALLING PARTY ANNOUNCEMENT MESSAGE MANAGEMENT SYSTEMS AND METHODS

BACKGROUND OF THE INVENTION

1. Field of the Invention

The present invention relates generally to the field of caller identification devices and, specifically, to a method and apparatus for detecting caller identification information and selecting predetermined preferences responsive thereto.

2. Background Information

Over the past few years, the scope of telecommunications services has broadened, allowing telephone companies to provide a new variety of telephony offerings to subscribers. The most relevant feature of the telephony offerings to embodiments of the present invention is the caller identification service provided by the telephone companies. With the caller identification service, the calling party's telephone number is transmitted to the called party (assuming that the calling party's telephone number is not blocked). The calling party's telephone number is encoded in an incoming caller line identification ("ICLID") signal while the telephone of the called party is ringing. The called party then captures the ICLID signal and decodes the calling party's telephone number before picking up the telephone. This can be done by installing a caller identification box, which may be purchased from the telephone company or a telephone retail store, between the telephone line and the telephone. Also, many telephones now have the caller identification feature integrated therein. By using the caller identification box to identify the calling party's telephone number, the called party can "screen" calls. In addition, the caller identification box displays and stores the telephone number(s) of those who have called, while the called party is away from the telephone.

An improvement to the caller identification box is described in U.S. Pat. No. 5,526,406 ('406) entitled "Calling Party Announcement Apparatus", issued to Luneau. The '406 patent relates to an apparatus for providing the identity of the caller in synthesized human speech in response to the ICLID signal provided by the telephone company. After the called party has answered the telephone, the calling party's name or telephone number is announced to the called party over the telephone receiver. The called party can elect to accept or reject the call before the telephone company central office has connected the two parties together. However, the '406 patent has several drawbacks including the use of synthesized human speech, which has marginal voice quality and complicated signal processing circuits and software to store and recall announcements.

SUMMARY OF THE INVENTION

The present invention comprises a caller identification method. In one embodiment, the caller identification method includes detecting an incoming telephone call, decoding a caller identification signal to provide an incoming telephone number responsive to detecting the incoming telephone call, and comparing the incoming telephone number with one or more stored telephone numbers. The method further includes performing one or more functions associated with a stored telephone number if the incoming telephone number matches the stored telephone number.

Other embodiments are described herein.

BRIEF DESCRIPTION OF THE DRAWINGS

FIG. 2 illustrates a table of records contained within the EEPROM of FIG. 1 according to one embodiment of the present invention.

FIG. 3 shows each field of a record contained within the table.

FIG. 4 shows the a timing diagram of an incoming caller line identification signal transmitted between ring and call waiting signals.

FIG. 8 illustrates a mapping of control bits of the configurations registers contained within the device.

FIG. 9 shows the commands issued to the SPI for configuring the device in the feed-through mode.

DETAILED DESCRIPTION

The present invention comprises a method and apparatus for detecting and decoding an incoming caller line identification ("ICLID") signal and selecting pre-determined preferences for call acceptance responsive thereto. The telephone numbers of known callers are stored in non-volatile memory in records. The incoming telephone number is compared to the telephone numbers stored in the records. Records are stored in no particular order at first, but once there is a match, the records are ordered in descending order of frequency. Each record includes a preference field indicating the action to be taken upon a match of the telephone number associated with the record and the incoming telephone number.

Figure 1:
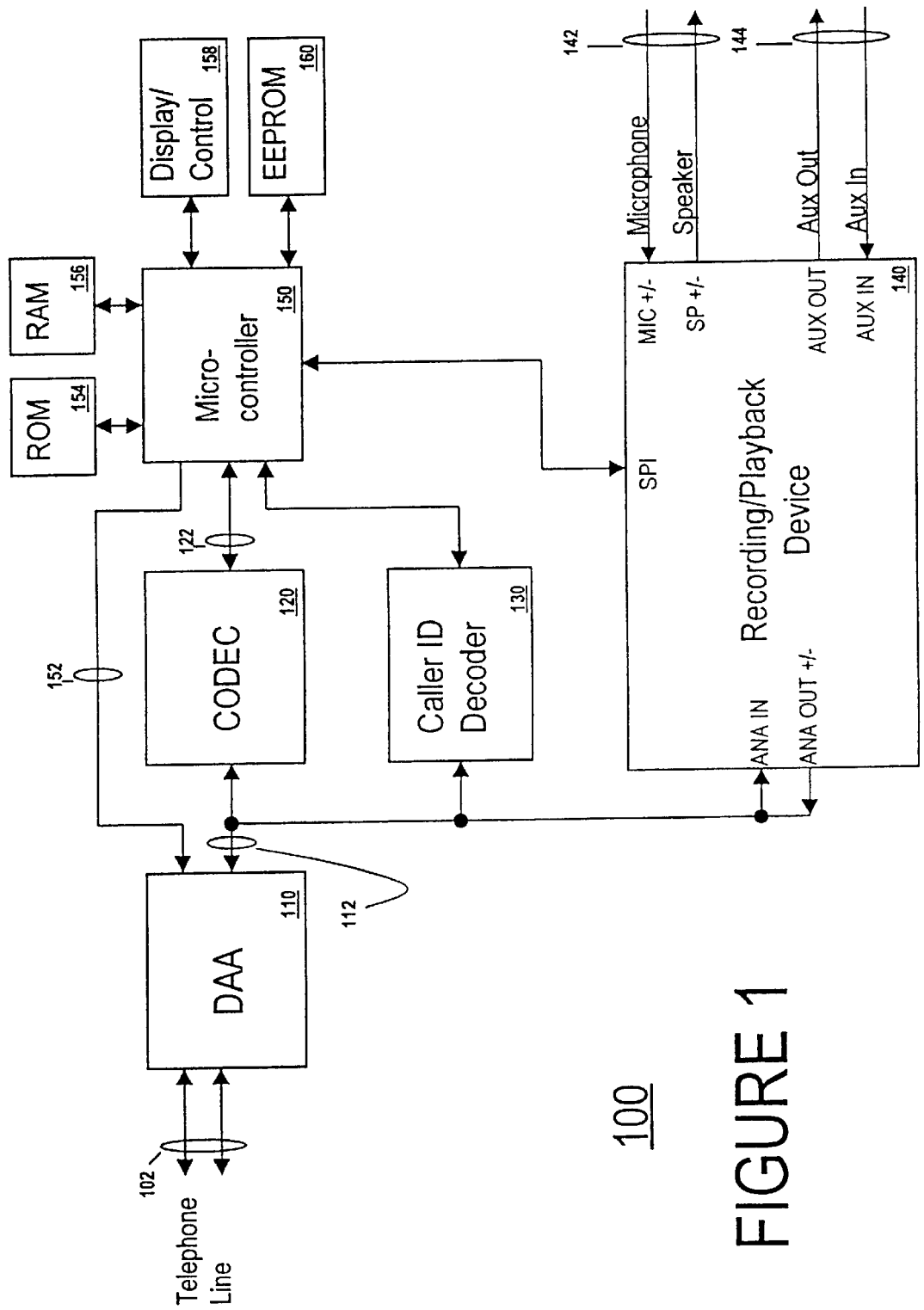
FIG. 1 illustrates a block diagram of a telephone control system according to one embodiment of the present invention.

FIG. 1 illustrates a block diagram of a telephone control system 100 according to one embodiment of the present invention. It must be noted that although embodiments of the present invention are shown and discussed with respect to a telephone control system in a home or office setting, other embodiments of the present invention may be implemented in, for example, portable communication products (e.g., cellular and cordless telephone systems, laptop and palmtop computers), personal recorders, automotive systems, etc.

Referring to FIG. 1, the telephone control system 100 includes a data access arrangement ("DAA") 110 coupled to telephone line 102 for interfacing between the telephone network equipment and the telephone control system 100. The DAA 110 is coupled to a coder/decoder ("CODEC") 120, a caller ID decoder 130, and a recording and playback system/device 140 by way of signal lines 112. The CODEC 120 is coupled to a microcontroller 150 by way of signal lines 122. The CODEC 120 performs analog-to-digital and digital-to-analog conversion of signals, and performs typical telephony functions. For example, the CODEC 130 converts a ring signal from the DAA 110 on signal lines 112 into a digital ring signal which is detected by the microcontroller 150 on signal lines 122. The CODEC 130 also converts a busy signal into a digital busy signal on signal lines 122. The microcontroller 150 transmits digital values to the CODEC 120, which generates and dials DTMF tones for making a telephone call. In addition, the CODEC 120 converts DTMF tones entered by a calling party during a call into corresponding digital values, which is detected by the microcontroller 150 (e.g., to remotely check messages using a password). The microcontroller 150 is coupled to the DAA 110 by way of signal line(s) 152 for controlling, among other things, an on-hook/off-hook relay (not shown) in the DAA 110. In other embodiments, the microcontroller 150 may be replaced with a microprocessor, an embedded controller, or a microprocessor system.

The primary role of the caller ID decoder 130 is to detect the ICLID signal that is transmitted by the telephone company (in the case where the calling party's telephone number is not blocked) in between rings or call waiting "beeps". In response to detecting the ICLID signal the caller ID decoder 130 decodes and transmits digital values to the microcontroller 150. Although this embodiment utilizes the caller ID decoder 130, it is done so for purposes of illustration and clarity. In another embodiment, the caller ID detection may also be accomplished with the CODEC 120. The analog outputs (ANA OUT+ and ANA OUT-) and analog input (ANA IN) of the device 140 are coupled to the DAA 110 by way of signal lines 112. The device 140 includes microphone inputs (MIC+ and MIC-) and speaker outputs (SP+ and SP-), collectively designated by numeral 142, for coupling to, for example, a standard telephone handset. Additionally, the device 140 includes an auxiliary input (AUX IN) and output (AUX OUT), designated by numeral 144, for interfacing to, for example, a telephone speaker, car kit interface (e.g., the base portion of a mobile communication system that is installed in a vehicle), etc.

The microcontroller 150 is coupled to the recording/playback device 140 via a serial peripheral interface ("SPI") for controlling the device 140 to operate in various modes, establish various signal paths, and control circuits contained therein. The device 140 includes an addressable memory array for recording and playing audio signals at specific memory locations. An embodiment of the recording/playback device 140 suitable for use with the present invention is described with respect to FIGS. 6 through 8.

The microcontroller 150 is also coupled to a read only memory ("ROM") 154, a random access memory ("RAM") 156, a display/control logic 158, and an electrically erasable programmable read only memory ("EEPROM") 160. The ROM 154 stores a program for controlling the microcontroller 150, and system 100, and may be partially or fully contained within the microcontroller 150 (e.g., as microcode). A FLASH memory device may be used in lieu of the ROM 154. The RAM 156 is used for storing instructions and/or data, and for providing temporary buffers. In addition, the instructions and/or data contained in ROM 154 may be loaded into RAM 156 at power up. The RAM 156 may alternatively be contained within the microcontroller 150. In one embodiment, the display/control logic 158 includes indicator lights, and a liquid crystal display for displaying messages such as, telephone numbers, names, preference settings, etc. The display/control logic 158 further includes control inputs (e.g., play, record, fast forward, rewind, pause, stop, keypad, arrows, etc.) for controlling answering machine functions, entering names and phone numbers, setting preferences, etc. The EEPROM 160 is a non-volatile type memory which may take other forms such as, for example, FLASH memory, battery-backed RAM, and the like. The EEPROM 160 is used by the microcontroller 150 to store records, configuration parameters, and message management pointers for message management capabilities.

FIG. 2 illustrates a table 170 of records contained within the EEPROM 160 of FIG. 1 according to one embodiment of the present invention. Referring to FIG. 2, the table 170 includes a plurality of records RECORD 1, . . . , RECORD R, where "R" is a positive whole number. FIG. 3 shows each field of a record contained within the table 170. As shown therein, the record includes a telephone number field 180 for storing numeric digits (e.g., 10 digits or 40 bits), a frequency field 182 indicating the number of matches (e.g., 14 bits), a preference field 184 for indicating the preferences for the record (e.g., 8 bits), first and second memory address fields 186 and 188 (e.g., 16 bits each), a visual display field 190 (e.g., 100 bits), and an extension field 192 (e.g., 2 bits). The preference field 184 indicates whether to (i) ignore the telephone call (i.e., let it ring through), (ii) play one of multiple outgoing messages from addressable memory and record a message, (iii) play an audio signal from memory identifying the calling party (e.g., a pre-recorded audio signal recorded by a user announcing the calling party's name), (iv) displaying a visual message and telephone number on the display; (v) answer the telephone call and place the call on hold; or combinations thereof.

The first memory address field 186 is a pointer in memory (contained within the device 140) pointing to, for example, the beginning of an outgoing message. The second memory address field 188 is also a pointer in memory pointing to, for example, the beginning of an audio message identifying the calling party to the called party. This audio message may be played over a speakerphone before the called party answers the telephone or through the handset to the user if the user is on the telephone. The extension field 192 indicates whether or not there is an extension to the next record for more display data. In operation, an ICLID signal is detected and decoded by the caller ID decoder 130. FIG. 4 shows a timing diagram of an ICLID signal transmitted between ring and call waiting signals, according to one embodiment of the present invention. As shown in FIG. 4, the ring and call waiting signals are shown by numeral 194, while the ICID signal is shown by numeral 196. The ring and call waiting signals have a distinctive frequency and cadence, and typically vary from one country to another. The caller ID decoder 130 includes circuitry to detect signals 196 by initiating a V.23 frequency shift keying ("FSK") modem receiver. The FSK signal 196 includes two frequencies, each representing a one or a zero. There are a number of techniques to detect the FSK signals 196 including using a phase lock loop, a discrete Fourier transform, fast Fourier transform, and band pass filters. However, it is to be noted that the technique is not important to the present invention. In one embodiment, the "ones" and "zeros" detected from the FSK signal 196 by the caller ID decoder 130 are assembled into digital values according to Bellcore Technical Reference specification TR-TSY-000031, published in Jan. 1990 by Bellcore™, of Morristown, N.J., now called Telcordia Technologies™. The digital values are then detected by the microcontroller 150.

The microcontroller 150 stores in a buffer (e.g., RAM 156) up to a predetermined number of digits (e.g., 10 digits) of the received telephone number. If the received telephone number is less than the predetermined number of bits, the rest of the higher order digits are padded with zeros. If the received telephone number has more than the predetermined number of digits, the highest one or more digits are discarded.

The microcontroller 150 then accesses the first record in the table 170, and extracts the telephone number in the telephone number field 180 of the record. The incoming telephone number is compared with the telephone number in the record starting with the least significant digit. The records are accessed in descending order of frequency with the most frequently matched record being accessed first. If a digit matches, the microcontroller 150 proceeds to the next digit. If a digit of the received number does not match the corresponding digit of the accessed telephone number, the microcontroller 150 determines whether the digit is a zero. If the digit is not a zero, the comparison process is terminated, a new record is obtained, and the process starts over. If the digit is zero, the processor proceeds to check the remainder of the digits. If a zero appears in the remainder of the digits, the microcontroller 150 considers a match between the received telephone number and the telephone number in the record. That is, a check for leading zeros is performed prior to terminating the comparison process. Leading zeros are treated the same as a match.

If a comparison is not successful, the next record is obtained and searched in the same way. The number of matches field is saved for the last record searched and when a match is found, the match field of the present record is updated and compared to the last record match field number. In this way, the records can be stored in descending order of frequency to maximize the probability of quickly finding a match. If the end of the table is reached and there is no match, a default action is taken such as, for example, displaying the received telephone number on the display 158 and/or playing the calling party's audio over a speakerphone to allow the called party to listen to the calling party.

If a comparison is found, the number in the frequency field 182 is increased and the preferences field examined to perform the associated preferences. In one embodiment, the preference field provides that the call (i) ring through without answering, (ii) be displayed, (iii) be displayed and an audio announced over a speakerphone to identify the calling party, (iv) put on hold, (v) play one of a number of outgoing messages and take a voice message, (vi) forwarded the telephone call to a different telephone number, and combinations thereof.

Figure 5:
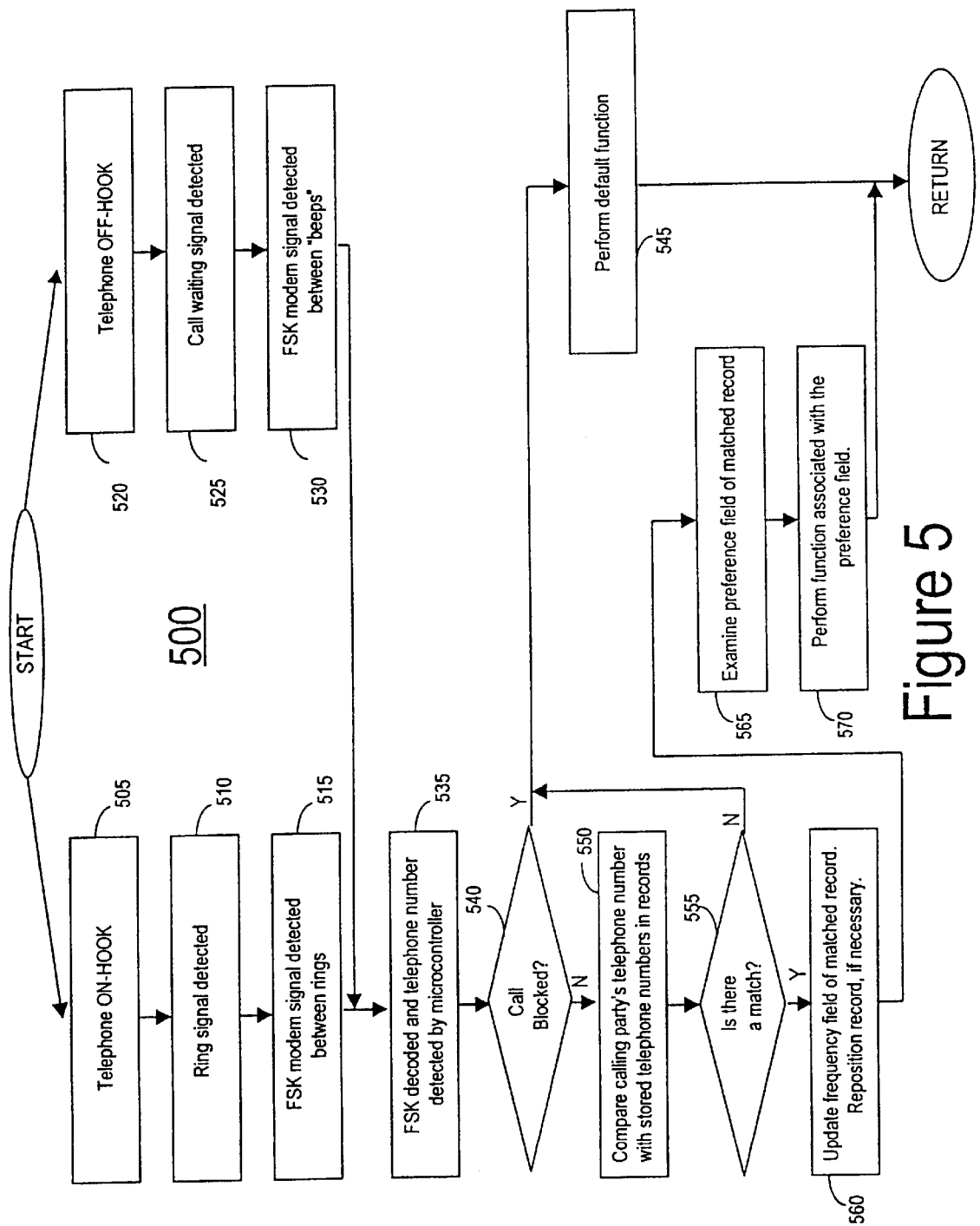
FIG. 5 illustrates a flow diagram of a process, according to one embodiment of the present invention.

FIG. 5 illustrates a flow diagram of a process 500, according to one embodiment of the present invention. Referring to FIG. 5, the process 500 commences at either block 505 or block 520 depending on whether the telephone is on-hook or off-hook. At block 505, with the telephone on-hook, if there is an incoming call, the microcontroller 150 detects the ring signal at block 510. The microcontroller 150 then notifies the caller ID decoder 130 to look for and detect the ICLID signal. At block 515, the caller ID decoder 130 detects the ICLID signal between rings. At block 520, with the telephone off-hook, the process moves to block 525 when a call waiting signal is detected. At block 530, the caller ID decoder 130 detects the ICLID signal between beeps. At blocks 515 and 530, the process moves to block 535 where the microcontroller 150 receives the telephone number or a block command.

The process moves to block 540 where a determination is made as to whether the telephone number is blocked. If the telephone number is blocked, the process moves to block 545 where a default function is performed, as will be described below. If the telephone number is not blocked, the process moves to block 550, where the received telephone number is compared to the telephone numbers in the telephone number fields of each record, beginning with the record having the highest value in the frequency field 182. At block 555, if the received telephone number fails to match the telephone numbers stored in the records, the process moves to block 545 where a default function is performed. For example, the default function includes displaying the string "NUMBER BLOCKED" or "NUMBER NOT RECOGNIZED" on the display 158, playing a default audible announcement from memory, causing the call to be answered after, for example, four rings (if the call is not picked up), playing a standard outgoing message, and recording the message. At that point, the process 500 returns to detecting another incoming telephone call.

At block 555, if there is a match between the incoming telephone number and a telephone number in a record, the process moves to block 560. At block 560, the frequency field of the matched record is incremented. At block 565, the preference field 184 of the matched record is examined, and at block 570 the function(s) associated with the preference field is performed. As can be seen, embodiments of the present invention provide a simple, flexible, and improved telephone control system that allows a user to select preferences associated with incoming telephone calls.

Figure 6:
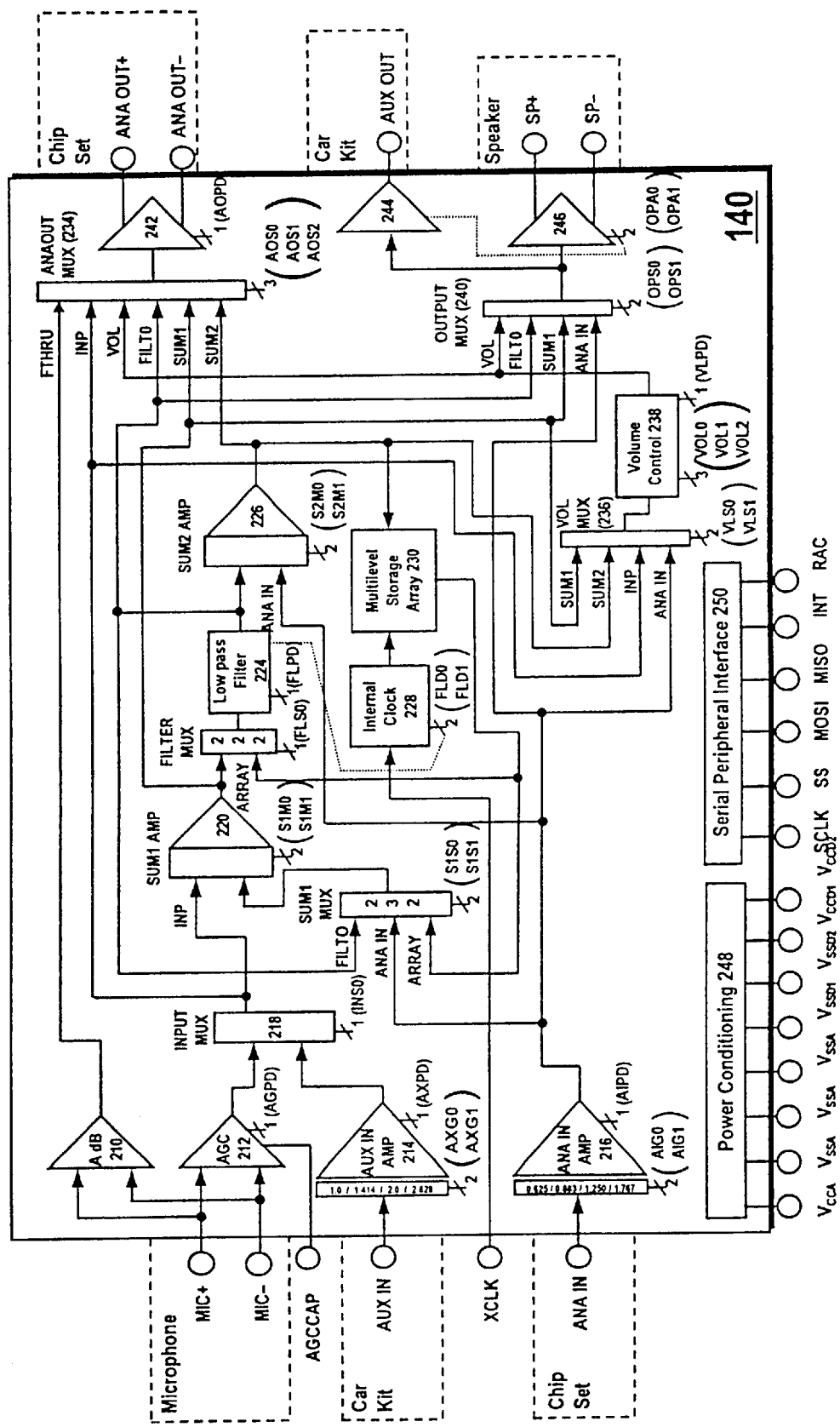
FIG. 6 illustrates a block diagram of the recording and playback device of FIG. 1, according to one embodiment of the present invention.

FIG. 6 illustrates a block diagram of the recording and playback device 140 of FIG. 1, according to one embodiment of the present invention. The analog recording and playback device 140 is described in more detail in co-pending U.S. patent application Ser. No. 09/184,454 filed Nov. 2, 1998, entitled "A Multiple Message Multilevel Analog Signal Recording And Playback System Containing Configurable Analog Processing Functions", and assigned to the assignee of the present invention, the contents of which are incorporated herein by reference. It must be noted that the specific architecture of the device 140 shown in FIG. 6 is not a requirement in embodiments of the present invention.

Referring to FIG. 6, the device 140 includes five major sections, namely, multiple analog input and output paths, two core analog processing sections, a multilevel analog storage array, a serial peripheral interface, and a volume control circuit. The device 140 includes an addressable multi-level storage array 230 for recording and playing audio waveforms. The audio paths of the device 140 enable full duplex conversation recording, voice memo, answering machine including outgoing message playback, and call screening features. Moreover, the device 140 allows messages to be played back while the telephone is in standby and both simplex and duplex playback of messages while on a telephone call.

Power is supplied to the analog section, multilevel storage array, and digital section from separate VCC and VSS supply pins. The voltage inputs (VCCA, VCCD1, and VCCD2) and ground inputs (VSSA, VSSD1, and VSSD2) are connected to a power conditioning circuit 248, which supplies regulated power to the circuits within the device 140.

The device 140 comprises various signal inputs paths. These include a microphone input path (microphone inputs MIC+ and MIC−), an auxiliary input path (AUX IN), and an analog input path (ANA IN). The microphone inputs MIC+ and MIC− are coupled to amplifiers 210 and 212. The microphone input (MIC+ and MIC−) has two separate input paths. The first path is a feed-through path (FTHRU) and involves the amplifier 210, which has a fixed gain of A dB, where "A" is a positive number (e.g., 6 dB gain). The amplifier 210 is a high quality amplifier for passing an analog signal from the called party to the ANA OUT+/− outputs of the device 140 without alteration or storage of the analog signal. This analog signal is passed to the DAA 110 of FIG. 1 for transmission to the calling party. The second path, involving amplifier 212, is mainly used internally for storing an analog signal. The amplifier 212 includes automatic gain control ("AGC") feedback for producing a fixed signal level, which can then be stored in the multilevel analog storage array 230. An AGPD control signal line is coupled to the amplifier 212 for powering the amplifier up/down. Bit 0 of CFG1 controls the AGPD control signal. Also coupled to the amplifier 212 is an AGCCAP signal line which performs a peak detect function for both the AGC during record and the auto-mute feature during playback.

The auxiliary input AUX IN is coupled to variable gain amplifier 214 and the analog input ANA IN is coupled to variable gain amplifier 216. Variable gain amplifiers 214 and 216 are independently configurable, by setting bits in CFG0, to provide one of a plurality of gain levels. In one embodiment, each amplifier is configurable to one of four gain levels, although a different number of gain levels may be provided. This allows the inputs to interface to a variety of signal levels. The auxiliary input AUX IN is designed to interface to a "high level" input (e.g., on the order of hundreds of millivolts) such as, for example, a car kit interface or other types of audio sources. The two signal lines AXG0 and AXG1, which are controlled by bits 11 and 12 of CFG0, control the gain of the amplifier 214. In one embodiment, the gain levels for amplifier 214 are 1, 1.414, 2, and 2.828. An auxiliary input power down signal (AXPD) is coupled to the variable gain amplifier 214 for powering up/down the same. Bit 10 of CFG0 controls the power up/down state of amplifier 214.

The analog input ANA IN is designed to interface to the DAA 110 (FIG. 1) to deliver the calling party's voice or signal to the device 140. The signal lines AIG0 and AIG1 control the gain of amplifier 216, which are controlled by bits 14 and 15 of CFG0. In one embodiment, the gain levels for amplifier 216 are 0.625, 0.883, 1.250, and 1.767. An analog input power down signal (AIPD) is coupled to the variable gain amplifier 216 for powering up/down the same. Bit 13 of CFG0 controls the power up/down state of amplifier 216.

The device 140 includes a first core portion having an input source multiplexer (INPUT MUX) 218, a first summing multiplexer (SUM1 MUX) 232, and a first summing amplifier (SUM1 AMP) 220. The INPUT MUX 218 receives inputs AGC AMP and AUX IN from the AGC amplifier 212 and the variable gain amplifier 214, respectively. A control signal INS0, which is controlled by bit 9 of CFG0, selects the input (i.e., the input source) that is passed to the output of the INPUT MUX 218. The INPUT MUX 218 is coupled to a first input of SUM1 AMP 220. The SUM1 MUX 232, which is a secondary source selector, selects one of three inputs that is passed to the output. The inputs include the ANA IN input from the variable gain amplifier 216, an ARRAY input (which is an output of the storage array 230), and a FILTO input (output of a low pass filter 224). The ARRAY input is a direct output of the storage array 230, and the FILTO is a filtered output of, for example, the storage array 230. Control signals S1S0 and S1S1 determine the output of the SUM1 MUX 232, responsive to bits 9 and 10, respectively, of CFG1.

The SUM1 MUX 232 is coupled to a second input of the SUM1 AMP 220. The SUM1 AMP 220 is a summing amplifier that operates in various modes. Control signals S1M0 and S1M1, responsive to bits 7 and 8, respectively, of CFG1, control the mode of the SUM1 AMP 220. In a first mode, the SUM1 AMP 220 mixes the inputs coupled thereto to provide a mixed analog output signal. In a second mode, the SUM1 AMP 220 operates as a buffer, passing one or the other input to the output. In a third mode, the SUM1 AMP 220 is in a power down condition.

A second core portion of the analog recording and playback device 140 includes a filter multiplexer (FILTER MUX) 222, a low pass filter 224, a second summing amplifier (SUM2 AMP) 226, an internal clock circuit 228, and a multilevel analog storage array 230. This second core portion mainly involves recording and/or playback of analog signals. The inputs to the FILTER MUX 222 include the SUM1 input (output of SUM1 AMP 220) and the ARRAY input (output of the storage array 230). Control signal FLSO, which is controlled by bit 4 of CFG1, determines the output of the FILTER MUX 222. The FILTER MUX 222 is coupled to the low pass filter 224 which is used for anti-aliasing and smoothing analog signals passing therethrough. Control signal FLPD, which is controlled by bit 1 of CFG1, is coupled to the low pass filter 224 for powering up/down the same. The output (FILTO) of the low pass filter 224 is coupled to a first input of the SUM2 AMP 226. The output of the variable gain amplifier 216 is coupled to a second input of the SUM2 AMP 226.

Similar to the SUM1 AMP 220, the SUM2 AMP 226 operates in various modes, responsive to control signals S2M0 and S2M1 coupled thereto. The control signals are controlled by bits 5 and 6 of CFG1. In a first mode, the SUM2 AMP 226 mixes the inputs coupled thereto to provide a mixed analog output signal. In a second mode, the SUM2 AMP 226 operates as a buffer, passing one or the other input to the output. In a third mode, the SUM2 AMP 226 is in a power down condition. The SUM2 AMP 226 is coupled to the multilevel analog storage array 230. The recording technique, column drivers, and corresponding circuitry of the storage array 230 are substantially identical to the storage array described in co-pending application Ser. No. 09/115,442, assigned to the assignee of the present invention, the contents of which are herein incorporated by reference. In one embodiment, the storage array 230 includes 1200 rows and 1600 columns of analog storage cells. Each storage cell stores one of a plurality of discrete voltage levels (e.g., 256 levels).

Clocking of the storage array 230 is derived either from an internal oscillator or, alternatively, from an external clock coupled to the XCLK pin. The clock sets the sample rate of the storage array. Control bits FLD0 and FLD1, which are controlled by bits 2 and 3 of CFG1, are coupled to the internal clock 228 to set the sample rate. In one embodiment, the internal clock 228 provides one of four sample rates (e.g., 4, 5.3, 6.4, or 8 kHz). Other sample rates may be provided, depending on design choice. The control bits FLD0 and FLD1 are also coupled to the low pass filter 224 for changing the cut-off frequency as the sample rate changes.

For example, in an answering machine application, a high quality 8 kHz sample rate is used for an outgoing message, and a lower quality sample rate (e.g., 4 kHz) is used for incoming messages to increase the amount of recording time available. The incoming messages can also be stored as high quality. However, if the free memory space decreases, the sample rate of the storage array 230 can be adaptively changed to maximize the remaining free storage space. Each new message starts at the beginning of a new row, so that each message can have a different sample rate.

The device 140 includes volume control circuitry having a volume multiplexer (VOL MUX) 236 and a volume control circuit 238. Control signals VLS0 and VLSI, controlled by bits 14 and 15 of CFG1, are coupled to the VOL MUX 236 for selecting one of four possible inputs as an output. The inputs to the VOL MUX 236 include SUM1 (output of SUM1 AMP 220), SUM2 (output of SUM2 AMP 226), INP (output of INPUT MUX 218), and ANA IN (output of variable gain amplifier 216). The VOL MUX 236 is coupled to the volume control circuit 238. Control signals VOL0–VOL2 are coupled to the volume control circuit 238, responsive to corresponding bits 11–13 of CFG1. The control signals VOL0–VOL2 control the attenuation factor of analog signals provided to the input of the volume control circuit 238 (e.g., one of eight volume levels). A VLPD signal, controlled by bit 0 of CFG0, is also coupled to the volume control circuit 238 to power down/up the same.

A first output path of the device 140 includes an analog output multiplexer (ANAOUT MUX) 234 and an output amplifier 242. The signals coupled to the ANAOUT MUX 234 include FTHRU (output of amplifier 210), INP (output of INPUT MUX 218), VOL (output of volume control circuit 238), FILTO (output of low pass filter 224), SUM1 (output of SUM1 AMP 220), and SUM2 (output of SUM2 AMP 226). Control signals AOS0–AOS2, responsive to corresponding bits 6–8 of CFG0, determine the output of the ANAOUT MUX 234. The amplifier 242 amplifies the analog signal at its input and provides a balanced fully differential output on the ANA OUT+/–outputs. The amplifier 242 is coupled to the DAA 110 (FIG. 1), transmitting the analog signals at the output of the amplifier 242 to the calling party. Control signal AOPD is coupled to the amplifier 242 for powering up/down the same. Bit 5 of CFG0 controls the state of the AOPD control signal.

Second and third output paths of the device 140 include an output multiplexer (OUTPUT MUX) 236, variable gain amplifier 244, and speaker driver amplifier 246. The signals coupled to the OUTPUT MUX 236 include VOL, FILTO, SUM1, and ANA IN. Control signals OPS0 and OPS1, responsive to bits 3 and 4 of CFG0, determine the output of the OUTPUT MUX 236. The analog signal at the output of the OUTPUT MUX 236 is either driven by the amplifier 244 or the speaker driver amplifier 246. Control signals OPA0 and OPA1, responsive to bits 1 and 2 of CFG0, are coupled to the amplifiers 244 and 246 to control the output path of the analog signal. If both the control bits are high, then amplifier 244 is operational to drive the analog signal to an auxiliary output (e.g., a car kit interface or speakerphone), and amplifier 246 is powered down. If the control bits (OPA0–OPA1) are "01" or "10", then amplifier 246 is operational at gains of 1.6 or 1.32, respectively, to drive a speaker (e.g., in a telephone handset), and amplifier 244 is powered down. The two different gain levels are provided for driving different outputs, and may be modified or changed depending on design choice and the transducer to be driven. If both bits are low, then both amplifiers are powered down.

The most basic operation of the device 140 is the feed-through mode, where a user communicates with a remote caller without the device recording, playing back, or mixing the analog signals flowing therethrough. In this mode of operation, the affected circuits include the high-quality amplifier 210, ANAOUT MUX 234, amplifier 242, variable gain ANA IN AMP 216, OUTPUT MUX 240, and speaker driver amplifier 246. The analog signal of the user, received at the microphone inputs MIC+ and MIC–, passes through the amplifier 210, ANAOUT MUX 234, and amplifier 242 to the analog outputs ANA OUT+ and ANA OUT–. The analog signal is received by the DAA 110 which forwards the analog signal upstream to the remote caller. The remote caller's analog signal flows is received at the ANA IN input of the device 140. This analog signal passes through variable gain amplifier 216, OUTPUT MUX 240, and speaker driver amplifier 246 which drivers a speaker (e.g., in a handset).

In an alternative embodiment, the user's analog signal may be received at the AUX IN input rather than the microphone input, and the remote caller's analog signal may be routed to the AUX OUT output. The AUX IN input and AUX OUT output may include a car kit interface (e.g., speakerphone and microphone). In this alternative embodiment, the user's analog path includes the AUX IN AMP 214, INPUT MUX 218, ANAOUT MUX 234, and amplifier 242, while the remote caller's analog path includes the ANA IN AMP 216, OUTPUT MUX 240, and amplifier 244.

The commands issued by the microcontroller 150 to the SPI 250 for configuring the device 140 in the feed-through mode is shown in FIG. 9. In this mode, both configuration registers are loaded. Referring to FIG. 9, the first command includes a command byte CMD1 and two bytes of data DATA1 for loading in CFG0. The letter "a" in the C5 field of CMD1 indicates that the bit is set if the device is already active, but left cleared if the device is powered down. The letters "b" and "c" in the AIG1 and AIG0 fields of DATA1 indicate that these value are set to produce an internal signal level of Y-mV peak-to-peak, where in one embodiment Y is 500. The second command includes a command byte CMD2 and two bytes of data DATA2 for loading in CFG1. The letter "X" indicates "don't care" values. Once CFG1 is loaded, the device is configured in the feed-through mode. Numerous other operating modes exist including, but not limited or restricted to, record mode, play outgoing message mode, full-duplex play and record modes, simplex play mode, and voice pager mode. These operating modes and signal paths are shown in detail in co-pending U.S. patent application Ser. No. 09/184,454.

Figure 7:
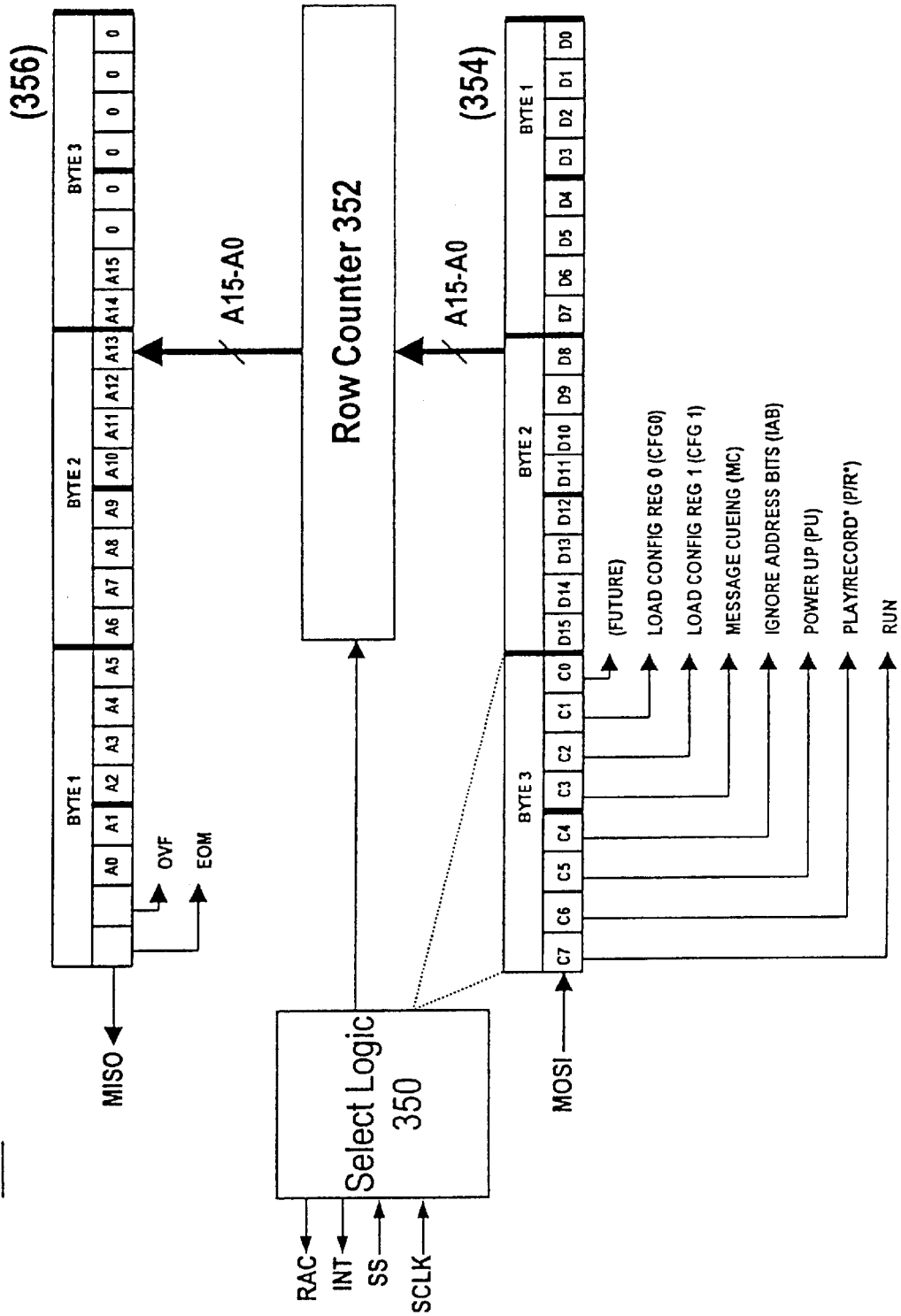
FIG. 7 illustrates a block diagram of a portion of the SPI.

Read/Write access to all the internal circuits of the device 140 is provided by way of the SPI 250. FIG. 7 illustrates a block diagram of a portion of the SPI 250. Referring to FIG. 7, the SPI 250 includes a select logic 350, row counter 352, input shift register 354, and an output shift register 356. The input shift register 354 is coupled to the MOSI pin and receives serial input data from the microcontroller 150 of FIG. 1. The output shift register 356 is coupled to the MISO pin for transmitting serial output data to the master device. The row counter 352 receives address inputs A15–A0 from the input shift register 354 (when IAB=0). This address is used to playback or record at address A15–A0, depending on the command. The row counter also provides the current address A15–A0 of the memory array pointer to the output shift register 356.

In particular, the SCLK and SS inputs coupled to the select logic 350, Master Out Slave In ("MOSI") input coupled to the input shift register 354, and Master In Slave Out ("MISO") output coupled to the output shift register 356 allow the microcontroller 150 to communicate with and check the status of the device 140. The SCLK signal is the clock input to the device. It is generated by the microcontroller 150 and is used to synchronize data transfers in and out of the device 140 through the MOSI and MISO terminals, respectively. The SS signal, when LOW, selects or activates the SPI 250. The MOSI input is a serial data input to the SPI 250, while the MISO output is the serial data output of the device 140. This output goes into a high-impedance state if the device 140 is not selected.

The select logic 350 of the SPI 250 generates interrupt signal (INT) and row access clock ("RAC") outputs for handshaking purposes. The INT output is an open-drain output which is activated (pulled low) when the device reaches an end of message ("EOM") marker in play or when the memory array is full (an overflow "OVF" condition). Each operation that ends in an EOM or OVF will generate an interrupt, indicating the end of a record, playback, or message cueing cycle. The interrupt is cleared the next time an SPI cycle is initiated.

The RAC output is an open drain output that provides a signal with a 200 ms period at 8 kHz sampling frequency. This represents a single row of memory cells within the storage array 230. In one embodiment, the storage array 230 (FIG. 6) of the device 130 includes 1200 rows of memory cells. The signal remains HIGH for 175 ms and stays LOW for 25 ms when it reaches the end of a row. This pin may be used for implementation of message management techniques.

The command format, in the preferred embodiment, is three bytes long comprising a control byte (C7–C0) followed by two data bytes (D15–D0). Control bit C7 is the RUN control bit, C6 is the play/record control bit (P/R*), C5 is the power up/down control bit (PU), C4 is the Ignore Address control bit (IAB), C3 is a message cueing bit (MC), C2 is the configuration register one (CS1) control bit, C1 is the configuration register zero (CS0) control bit, and C0 is reserved for future use. Bits D15–D0 are the address of the row decoder 352 or the data to be stored in the configuration registers, depending on the IAB bit. Table 1 shows the operation summary of the control bits.

TABLE 1

| Instruction | Control bit | Operational Summary |
|---|---|---|
| RUN (C7) | | Enable or Disable an operation |
| = | 1 | Start |
| = | 0 | Stop |
| P/R* (C6) | | Selects Play or Record Operation |
| = | 1 | Play |
| = | 0 | Record |
| PU (C5) | | Master power control |
| = | 1 | Power-Up |
| = | 0 | Power-Down |
| IAB (C4) | | Ignore address control bit |
| = | 1 | Ignore input address (D15–D0) |
| = | 0 | Use the input address register contents for an operation (A15–A0) |
| MC (C3) | | Message Cueing |
| = | 1 | Enable message cueing |
| = | 0 | Disable message cueing |
| CS1/0 (C2, C1) | | Access to Configuration Registers |
| CS1= | 1 | Access to Configuration Register One (CFG1) |
| CS0= | 1 | Access to Configuration Register Zero (CFG0) |
| D15–D0 | | Data Bits |

Message cueing is started at a specified address (bits D0–D15 are loaded into row counter 352) with the IAB bit active (IAB=0) or at the current address with the IAB bit active (IAB=1). When the message cueing bit C3 is set, the user can skip through message without knowing the actual physical location of the messages. This operation is used during playback. In this mode, the messages are skipped many times faster than in normal playback mode. In a preferred embodiment, the messages are skipped 1600 times faster than in normal playback mode. Message cueing terminates when an EOM marker is reached. Then, the internal address counter will point to the next message. A summary of the instructions sent by a master device to the SPI 250, along with the corresponding operations, is provided in Table 2.

TABLE 2

| Instruction | Control bits C7–C1 | Operational Summary |
|---|---|---|
| POWER UP | 0010000 | Power Up. Device will be ready for an operation after a power up delay period (Tpud). |
| SETREC | 1010000 | Initiate recording starting at the address A15–A0. |

TABLE 2-continued

| Instruction | Control bits C7–C1 | Operational Summary |
|---|---|---|
| STOPPWRDN | 0x01x00 | Stop an operation and Power Down. |
| STOP | 0x11000 | Stop Record or Playback operation. |
| SETPLAY | 1110000 | Start Playback at address A15–A0. |
| REC | 1011000 | Start Record at the next available address. |
| SETMC | 1110100 | Initiate Playback and Message Cueing (MC) at the address specified by A15–A0. |
| MC † | 1111100 | Initiate a Playback and Message Cueing at the next available address. |
| PLAY | 1111000 | Play at the next available address (ignore address bits). |
| RINT †† | 0x11000 | Read Interrupt status bits: Overflow and EOM. |
| LOAD CFG1 | 0xx1010 | Load configuration register one. This command is followed by two bytes of data. |
| LOAD CFG0 | 0xx1001 | Load configuration register zero. This command is followed by two bytes of data. |

† Message cueing can be selected only at the beginning of play operation.
†† As the interrupt data is shifted out of the device 140, control and address data is being shifted in. The interrupt command should be compatible to the current command if there is no change to the device operation.

The control bits C7–C0 are provided from the input shift register 354 to the select logic 350. Upon latching the control data from the input shift register 354, the select logic 350 generates control signals that are distributed internally to various circuits within the device 140 to control power-down, recording/playing operation, message cueing, and the IAB. The select logic 350 receives additional inputs from internal signals such as low VCC detect ("LOVCC") and Power on Reset ("POR").

The INT signal and the status bits (EOM and OVF) are generated by the select logic 350. The INT signal is cleared after the status has been read by the microcontroller 150 (FIG. 1). The internal operation of the device 140 does not depend on the time at which the interrupt was cleared. By way of example, when the device 140 is in the play mode and encounters an EOM marker, the device 140 stops playing and generates an interrupt. Similarly, when the device 140 is in overflow, indicating that a record, playback, or message cueing cycle has reached the end of the last row in the storage array 230 (FIG. 6), the device 140 generates an interrupt and stops the operation.

In implementing the flexible message management system three criteria must be met. First, a scheme for reading the address of the row pointer must be provided. Second, a flag for detecting the end of the current row must be provided. Third, the ability to load a new address (from the address register at the end of the current row, instead of incrementing the row pointer to the subsequent row), must be provided.

To accomplish these, first, the status bits EOM and OVF, and the address of the row pointer (A15–A0) are shifted out of the output shift register 346 via the MISO pin, during an SPI transfer. Second, the RAC signal provides for early detection of an end of a current row. As an example, for an 8 kHz sample rate, the maximum duration of a message in one row having 1600 cells is 200 ms. The RAC signal stays high (output held high by an external pull-up resistor) for 175 ms and changes to a low state for 25 ms. This waveform is periodic, and it tracks the sample rate of the internal 512 kHz oscillator and continues as long as the device 140 is recording or playing. Thirdly, the IAB bit in the control register 354 controls the manner in which the row counter 352 is loaded. If the IAB bit is set ("1"), the row address increments to the following row at the end of the current row. If the IAB bit is reset ("0"), a new address is loaded into the row address counter 352. This new address is the content of bits D15–D0 of the input shift register 354. The select logic 350 generates the appropriate control signals based on the value of the IAB bit.

FIG. 8 illustrates a mapping of control bits of the configurations registers, according to one embodiment of the present invention. These control bits control various signal paths, circuits, and controls within the analog recording and playback device 140. Referring to FIGS. 6 through 8, loading of the configuration registers is as follows: If configuration register zero ("CFG0") is to be modified, a load CFG0 command byte and two data bytes are transmitted to the input shift register 354. The two data bytes are then transferred to CFG0. Next, configuration register one is loaded by transmitting a load CFG1 command byte and two data bytes to the input shift register 354. Once the data is shifted in, the two data bytes are transferred to CFG1. This latter command must be loaded into the device regardless of whether CFG1 is to be changed or not because changes to CFG0 do not take effect until CFG1 is loaded. The control bits in the configuration registers are grouped such that CFG0 contains parameters that are rarely changed. On the other hand, the control bits in the CFG1 contains parameters that are more likely to be changed. Thus, for the loaded values of CFG0 to take effect, CFG1 must be loaded. The parameters in CFG1 take effect immediately after CFG1 is loaded.

In one embodiment, there are five types of configuration bits. A first type includes power down bits which mask the global power down bit (C5) to select the locks within the device to be powered up/down. The other types of configuration bits include MUX select bits for controlling the routing of analog paths within the device, sum select bits for controlling summing amplifiers, sample rate select bits for establishing the sample rate of the analog recording and the cut-off frequency of a filter, and volume level bits for setting the attenuation level of a volume control circuit.

Thus, what has been described is a method and apparatus for detecting a calling party's telephone number and selecting pre-determined preferences associated with the telephone number. Advantages to embodiment of the present invention include flexibility, simplicity of design by using an addressable analog recording and playback device without the need for a digital signal processor for speech synthesis, and lower cost due to the simple design.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A caller identification method, comprising:
   detecting an incoming telephone call;
   decoding a caller identification signal to provide an incoming telephone number responsive to detecting the incoming telephone call;
   comparing the incoming telephone number with a stored telephone number in a data structure stored in a digital memory, wherein said data structure further includes a preference indicator and a memory address;
   if the incoming telephone number matches a stored telephone number, checking said preference indicator to determine whether to ignore said incoming telephone call or to play an outgoing message stored in a multi-level analog storage array at said memory address; and
   if the preference indicator indicates to play said outgoing message, performing one or more functions associated with the stored telephone number including playing said outgoing message that is stored in said multilevel analog storage array at said memory address.

2. The caller identification method of claim 1 further comprising performing a default function if the incoming telephone number fail s to match the one or more stored telephone numbers.

3. The caller identification method of claim 1 wherein performing one or more functions associated with the telephone number comprises displaying the incoming telephone number.

4. The caller identification method of claim 1 wherein performing one or more functions associated with the telephone number comprises providing an address of a memory location to an analog recording and playback device to play an outgoing message.

5. The caller identification method of claim 1 wherein performing one or more functions associated with the telephone number comprises playing an unsynthesized audio signal from an analog recording and playback device identifying the calling party.

6. The caller identification method of claim 1 wherein comparing the incoming telephone number with one or more stored telephone numbers comprises comparing the incoming telephone number with each telephone number in one or more stored records.

7. The caller identification method of claim 6 wherein each record includes a preference field indicative of one or more functions to be performed if the incoming telephone number matches a telephone number in a record.

8. The caller identification method of claim 6 wherein each record includes a frequency field indicative of the number of successful matches between incoming telephone numbers and the telephone numbers in the records, the method further comprising incrementing a value in the frequency field of a record if the incoming telephone number matches the telephone number associated with the record.

9. The caller identification method of claim 1 wherein detecting the incoming telephone call comprises detecting caller identification signal in between ring signals.

10. The caller identification method of claim 1 wherein detecting the incoming telephone call comprises detecting a caller identification signal in between call waiting signals.

11. A telephone control system, comprising:
   a caller identification decoder for coupling to a telephone line;
   a recording/playback device including a multilevel analog storage array;
   a non-volatile memory including a data structure having a stored telephone number a preference indicator, and a memory address; and
   a microcontroller coupled to the non-volatile memory, the caller identification decoder, and the device, the microcontroller to receive an incoming telephone number in response to the caller identification decoder detecting a caller identification signal, to compare the incoming telephone number with said stored telephone number to check said preference indicator to determine whether to ignore said incoming telephone call or to play an outgoing message stored in a multilevel analog storage array at said memory address, and to perform one or more functions associated with the preference field including playing said outgoing message that is stored in said multilevel analog storage array at said memory address if said preference indicator indicates to play said outgoing message.

12. The telephone control system of claim 11 further comprising a telephone interface circuit coupled between a telephone line and the caller identification decoder and device.

13. The telephone control system of claim 11 further comprising a display device coupled to the microcontroller, the display device to display telephone numbers and other information.

14. The telephone control system of claim 11 wherein the recording and playback device comprises an addressable analog recording and playback device.

15. The telephone control system of claim 11 wherein the recording and playback device comprises an addressable analog storage array and analog processing paths.

16. The telephone control system of claim 11 wherein the microprocessor to transmit an address located in an address field in the matched record to the device for playing an audible tone to identify the calling party.

17. The telephone control system of claim 11 wherein the microprocessor to transmit an address located in an address field in the matched record to the device for playing an outgoing message.

18. An article of manufacture, comprising:
  a computer usable medium having computer readable program code contained therein for causing a processor to detect an incoming telephone call;
  computer readable program code for causing the processor to decode a caller identification signal and provide an incoming telephone number responsive to detecting the incoming telephone call;
  computer readable program code for causing the processor to compare the incoming telephone number with a stored telephone number in a data structure including a memory address and a preference indicator indicating whether to ignore said incoming telephone call or to play an outgoing message stored in a multilevel analog storage array at said memory address; and
  computer readable program code for causing the processor to perform one or more functions including playing said outgoing message stored in said multilevel analog storage array at said memory address if said preference indicator indicates to play said outgoing message.

19. The article of manufacture of claim 18 further comprising computer readable program code for causing the processor to provide an address of a memory location to an analog recording and playback device to play an outgoing message.

20. The article of manufacture of claim 18 further comprising computer readable program code for causing the processor to provide an address of a memory location to an analog recording and playback device to play an audio signal identifying the calling party.

21. The article of manufacture of claim 18 further comprising computer readable program code for causing the processor to compare the incoming telephone number with each telephone number in one or more stored records.

\* \* \* \* \*